(12) United States Patent
Rieger et al.

(10) Patent No.: US 6,449,181 B1
(45) Date of Patent: Sep. 10, 2002

(54) INVERTER FOR CONVERSION OF ELECTRICAL ENERGY

(75) Inventors: Reinhard Rieger; Kurt Reutlinger, both of Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/856,997

(22) PCT Filed: Sep. 29, 2000

(86) PCT No.: PCT/DE00/03404

§ 371 (c)(1),
(2), (4) Date: May 30, 2001

(87) PCT Pub. No.: WO01/26210

PCT Pub. Date: Apr. 12, 2001

(30) Foreign Application Priority Data

Oct. 1, 1999 (DE) .......................................... 199 47 476

(51) Int. Cl.[7] .......................... H02M 5/20; H02M 7/122
(52) U.S. Cl. .............................. 363/159; 363/37; 363/59
(58) Field of Search ................................ 363/159, 144, 363/143, 132, 56, 141, 37; 361/321.01, 321.02, 328

(56) References Cited

U.S. PATENT DOCUMENTS

| | | | |
|---|---|---|---|
| 5,132,898 A | * | 7/1992 | Nishizawa et al. ......... 363/144 |
| 5,142,439 A | * | 8/1992 | Huggett et al. ............. 361/321 |
| 5,576,943 A | * | 11/1996 | Keir ............................. 363/56 |
| 5,726,557 A | | 3/1998 | Kusase |
| 5,903,121 A | | 5/1999 | Maier |

FOREIGN PATENT DOCUMENTS

| | | |
|---|---|---|
| DE | 196 46 043 | 11/1996 |
| EP | 0 683 560 A | 11/1995 |
| EP | 0 740 394 A | 10/1996 |
| EP | 0 777 309 A | 6/1997 |

OTHER PUBLICATIONS

Patent Abstracts of Japan vol. 1995, No. 10, Nov. 30, 1995 & JP 07 170746 A, Jul. 4, 1995.

* cited by examiner

*Primary Examiner*—Rajnikant B. Patel
(74) *Attorney, Agent, or Firm*—Michael J. Striker

(57) ABSTRACT

Frequency converters for converting electrical energy, in particular for a vehicle electrical system, are proposed which have individual partial frequency converters and include at least one half bridge, as a result of which there are at least one high-side switch and one low-side switch with a predeterminable number of switches. The high-side switch and low-side switch have a common connection that is connected to means that produce the electrical energy. Parallel to the half bridge, there is an intermediary circuit capacitor whose capacitance should be as low as possible. To this end, the switches of the half bridge are triggered offset from one another so that the current to be supplied by the intermediary circuit capacitor remains as low as possible. Various possibilities are disclosed for the arrangement of the chokes of the frequency converter.

12 Claims, 9 Drawing Sheets k = 2 k = 4
UNSUITABLE k = 4
SUITABLE

INVERTER FOR CONVERSION OF ELECTRICAL ENERGY

The invention relates to a frequency converter for converting electrical energy, in particular for the electrical energy produced by a generator for an electrical system of a vehicle.

PRIOR ART

The frequency conversion of electrical energy, for example in an electrical system of a vehicle, usually takes place today by means of a static inverter. In these electronic power circuits, often direct quantities are converted into alternating quantities of a particular frequency or conversely, alternating quantities are converted into direct quantities. The alternating or direct quantities are, for example, voltages or currents. For conversion of quantities, it is also possible for direct quantities to be converted into direct quantities, for example a direct current is converted into a direct current with a different voltage level. With this voltage conversion, an energy flux in both directions can also take place.

Frequency converters with an intermediary voltage circuit (voltage converters) and autonomous bridge circuits, for example rectifier bridge circuits in a vehicle electrical system, are currently the standard design for nearly all frequency converter application areas. In this connection, the intermediary circuit can also be constituted directly by a direct current network. The intermediary circuit is required for temporarily storing the energy. A capacitor with the greatest possible capacitance serves as a temporary storage.

The required capacitance of the intermediary circuit capacitor is determined by the energy which it must temporarily store and by the alternating current resulting from it. Usually, an electrolytic capacitor is used for the intermediary circuit; if the temporary storage must hold larger quantities of energy, several electrolytic capacitors are used. These have a particularly high capacitance in relation to their volume, but due to their design they are very sensitive to high temperatures. Particularly at high temperatures, this leads to an aging of the electrolytic capacitors and to early failure. Other disadvantages of electrolytic capacitors are their low current carrying capacity, their relatively high internal resistance, and the parasitic inductances in series to the capacitance.

A frequency converter for converting electrical energy, which converts the electrical voltage supplied by a three-phase generator in a vehicle electrical system, is known, for example, from DE-OS 196 46 043. In this known system, the three-phase generator is simultaneously also operated as a starter. As a result, the machine can operate both as a starter and as a generator and, in order to optimally regulate the output voltage during generator operation, the electrical machine is connected to the vehicle electrical system, including the battery, via a controlled rectifier bridge and via an intermediary circuit capacitor. In this connection, the rectifier bridge includes six pulse inverter elements which are triggered by a control unit of the vehicle electrical system.

OBJECT OF THE INVENTION

The intermediary circuit capacitances required in the known voltage converters and the input capacitance in direct current converters (DC/DC converters) require a not inconsiderable amount of structural space. Frequently the intermediary circuit capacitor, for example an electrolytic capacitor, is the component with the greatest volume. Since this is a disadvantage, the object of the invention is to considerably reduce the value of the intermediary circuit capacitance and in particular also the size of the intermediary circuit capacitance and the intermediary circuit capacitor or the input capacitance in a voltage converter and as a result, to reduce the structural volume and the costs. Another object is to achieve a possibility of reducing the capacitance so far that electrolytic capacitors customarily used in the intermediary circuit can be forsaken for other capacitor principles. A further object of the invention is to embody choke devices so that the different branches of the frequency converter are decoupled from one another.

ADVANTAGES OF THE INVENTION

The frequency converter for converting electrical energy, with the characteristics of claim 1, has the advantage that one capacitor, whose capacitance is considerably reduced in comparison to conventional systems, suffices as the intermediary circuit capacitance. As a result, it is advantageously possible to reduce the size of the intermediary circuit capacitor and thereby to reduce the structural volume and the attendant costs. In a particularly advantageous manner, it is possible to design the frequency converter, which contains at least one high-side switch and one low-side switch, so that the required capacitance can be reduced so much that the customarily used electrolytic capacitors can be forsaken for other capacitor principles. This achieves the particular advantages that the low current carrying capacity of electrolytic capacitors and their sensitivities to temperature and aging can be circumvented.

Other advantages of the invention are achieved by means of the measures taken in the dependent claims. It is thereby advantageous that the frequency converter and/or the DC/DC converters can be designed as separate half bridges with semiconductor valves, which can also be advantageously combined to form a complete frequency converter module, which can be integrated in a particularly advantageous manner into the generator housing or the machine housing.

Through suitably offset triggering of the half bridges, a particularly low voltage ripple can be advantageously obtained. Short circuits are reliably prevented through simultaneous triggering of parallel connected semiconductor valves or semiconductor switches of a half bridge.

The use of coupled chokes permits a particularly advantageous decoupling of different branches of the frequency converter. The machine winding, for example for a delta connected claw-pole generator, can be embodied through advantageous disposition of the chokes so that a decoupling of two partial branches is achieved.

DRAWINGS

Exemplary embodiments of the invention are shown in the Figs. and will be explained in more detail in the subsequent description.

DESCRIPTION

Figure 1:
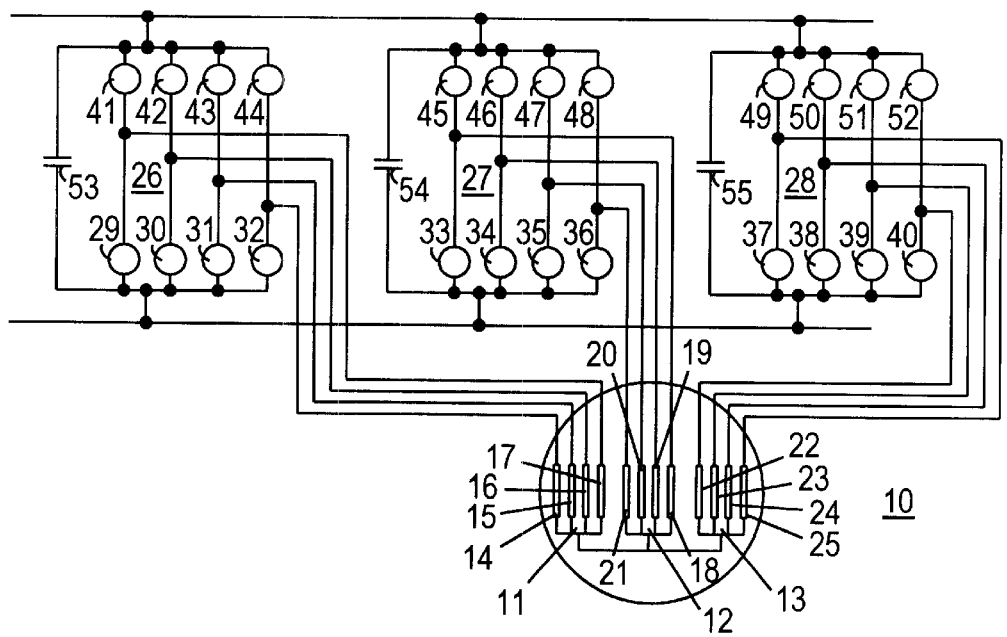
FIG. 1 shows a three-phase machine, indicated by way of example with four parallel branches per phase.

In static inverters for converting electrical energy, electronic power circuit semiconductors are used. As a result, frequency converters can often be divided up into so-called half bridges. As a result, for example, frequency converters for three-phase operation are made up of three half bridges which are also partially combined into a complete frequency converter module. DC/DC converters can also be produced by means of a half bridge. A half bridge is comprised respectively of a high-side switch and a low-side switch, also referred to below as a valve or semiconductor valve, and includes a number of transistors which depends on the number of phases. The switches can, for example, also be comprised of a suitable number of pulse inverter elements.

The capacitance of the intermediary circuit capacitor which is required for the functioning of a half bridge branch of this kind, when triggered with a pulse-to-width modulation (PWM) of the frequency $f_{PWM}$, is calculated according to the following equation:

$$C = \frac{v \cdot (1-v) \cdot I}{f_{PWM} \cdot \Delta U}$$

In this equation, I is the output voltage of the half bridge, the voltage fluctuation $\Delta U$ is the permissible so-called voltage ripple in the intermediary circuit (input side) and v is the instantaneous keying ratio of the pulse-to-width modulation (PWM). A multi-phase bridge is constituted by a corresponding number of half bridges. These half bridges are usually triggered offset from one another. As a result, the load on the intermediary circuit can be reduced since the individual phases draw current from the intermediary circuit in an offset manner and the voltage ripple is correspondingly lower. The maximal voltage ripple occurs at a PWM keying ratio of v=0.5.

Frequently, in order to achieve the required current carrying capacity of the switches, a number of semiconductor valves are connected in parallel in a half bridge. The parallel connected valves must be simultaneously triggered in any case in order to prevent a "hot branch" in the half bridge and thereby to prevent a short circuit of the intermediary circuit. As a result, the parallel connection of the individual valves behaves like "one" switch.

If the parallel connection of semiconductor valves to the output is now eliminated, then this half bridge results in a multi-phase device. This has the advantage that the loading of the intermediary circuit can be considerably reduced if the partial branches are triggered in opposition with one another. If the parallel branches are decoupled by means of inductances, then they can be reconnected in parallel and the advantage of the lower intermediary circuit load can also be achieved in three-phase devices, and even in the "monophase" device of a DC/DC converter.

In frequency converters and DC/DC converters comprised of half bridges, half bridges can also be realized in the form of complete modules which simultaneously include an intermediary circuit capacitor and/or a triggering circuit.

Frequently, both of the bridge switches are constituted by a parallel connection of a number of individual valves or switches. To this end, four parallel valves are shown by way of example in the individual FIGS., for example field effect transistors (MOSFETs). However, any other number of parallel semiconductors can also be used. Naturally valves other than the above-mentioned field effect transistors can be used as semiconductors, e.g. bipolar transistors or pulse inverter elements, etc. A three-phase frequency converter can consequently be comprised of three such half bridge modules. A DC/DC converter can be realized by means of a half bridge with a suitably selectable number of valves. The valves or switches are triggered by means of a control and regulating device which transmits the required triggering signals. In a vehicle electrical system, the voltage regulator, an electrical system control unit, or another control unit can be used as the control and regulating device.

Parallel Winding Branches for Multi-Phase Operation

In both mono-phase voltage converters and in three-phase machines, the winding can be comprised of various winding branches connected in parallel. In principle, it is possible to eliminate this parallel connection of the individual winding branches in the machine, e.g. in three-phase machines, and to route the connections separately to the frequency converter. An exemplary circuit is depicted in FIG. 1.

In this exemplary circuit, a three-phase generator 10 with the phase windings 11, 12, and 13 supplies the electrical energy. The phase windings are in turn divided into four respective parallel-connected winding branches 14 to 17, 18 to 21, and 22 to 25. The phase windings 11, 12, and 13 are associated with the half bridges 26, 27, and 28, which each contain four low-side switches 29 to 40 and four high-side switches 41 to 52. The intermediary circuit capacitors or intermediary circuit capacitances 53, 54, and 55 are disposed parallel to each half bridge 26, 27, and 28.

The parallel winding branches can now be separately connected to the parallel branches of each of the half bridges of the frequency converter. As a result of this, the three-phase machine becomes a multi-phase device. If the parallel branches of a half bridge (which are no longer connected to the output side or machine side) are now triggered in offset fashion, this results in a drastically reduced load on the intermediary circuit capacitor. However, this circuit has the disadvantage that it requires a multitude of connecting lines between the frequency converter and the machine.

This circuit can be used in an advantageous manner, though, if the individual half bridges are designed as complete modules and are integrated directly into the machine. In this connection, the half bridge modules can also be disposed distributed over the circumference of the machine.

Figure 2:
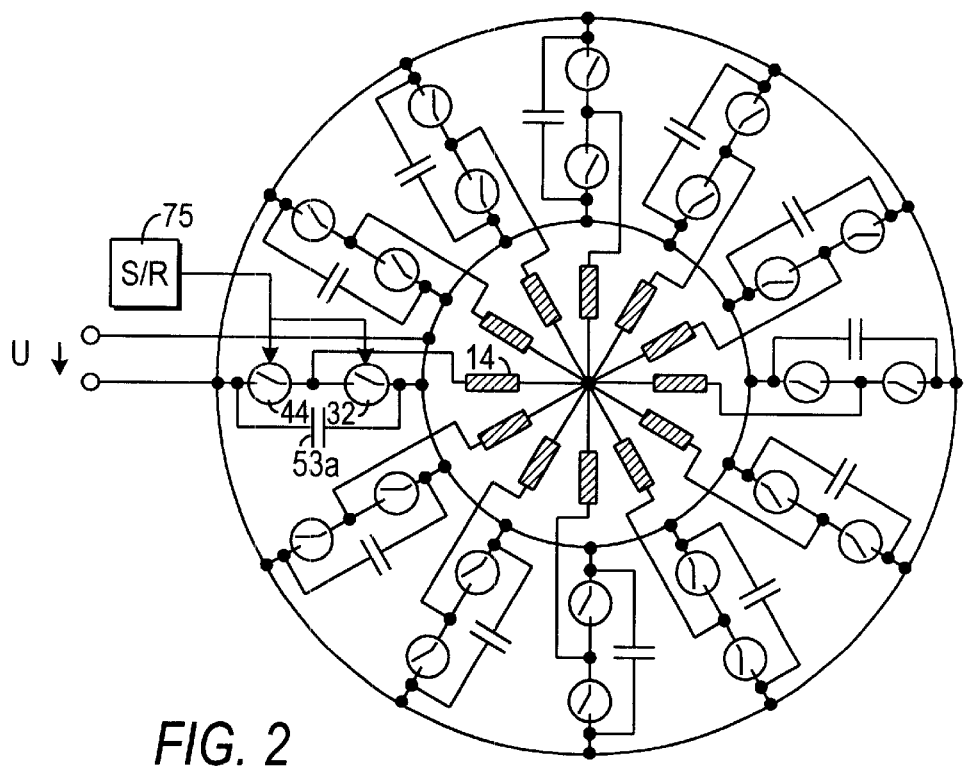
FIG. 2 shows a circuit embodiment in which the half bridge modules of the frequency converter are disposed distributed over the circumference of the machine.
Figure 3:
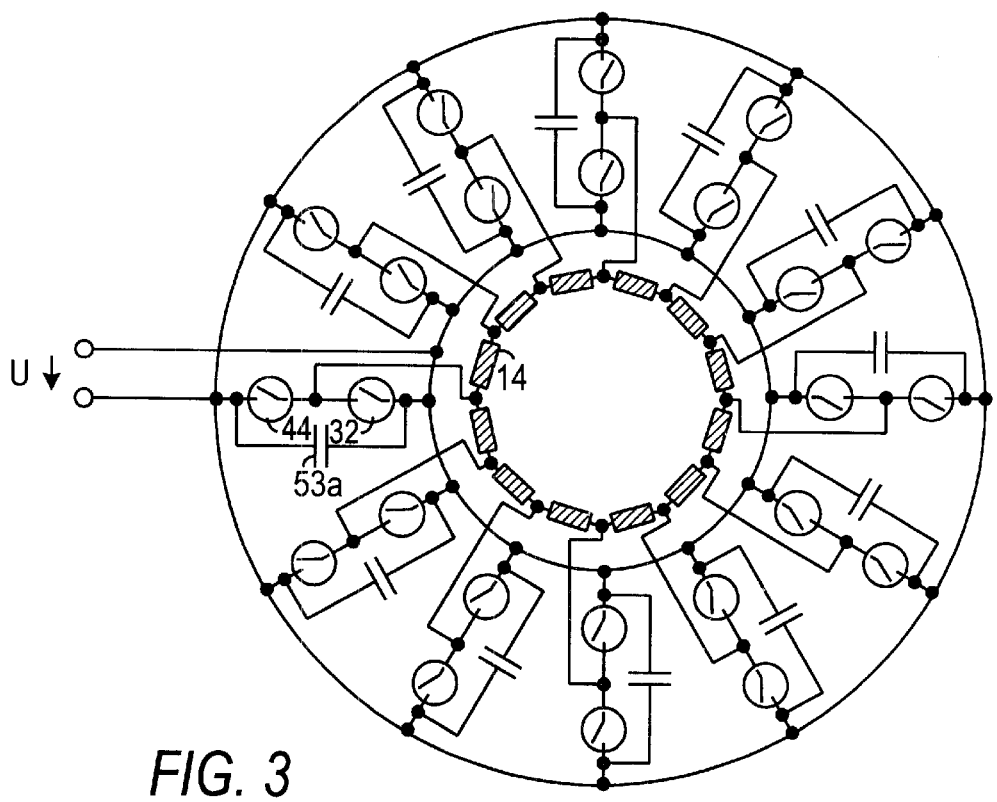
FIG. 3 shows another embodiment of a three-phase machine.

Naturally, instead of the multi-phase star-shaped circuit, a delta connection is also possible. In a multi-phase device, the delta connection becomes a polygonal circuit of the kind that also exists in the d.c. generator. In this instance, it is depicted as having 12 phases, but any other number of phases is also possible, in particular odd numbers of phases are also conceivable. Two exemplary circuits are shown in FIGS. 2 and 3. By way of example, reference numerals are provided for only one winding branch 14 with the associated valves or switches 32 and 44 and an intermediary circuit capacitance 53a. The switches are triggered by the control and regulating device 75. In FIG. 2, the connection between the control and regulating device 75 and the valves is shown by way of example for only the switches 32 and 44; this connection is naturally also present for the remaining switches. The voltage supplied by the generator 10 during operation is labeled U.

Instead of the multi-phase devices shown, it is also possible to select a connection of the winding that is comprised of several separate stars or triangles. For example, it is also possible, for the production of the multi-phase device, to provide a multi-pole machine with a separate winding for each pole pair and to connect these separately to the frequency converter branches.

Parallel Operation Inside a Half Bridge

Since the division of the winding into parallel winding strands in an external frequency converter has the disadvantage of the large number of connecting lines between the frequency converter and the machine, these parallel winding strands should be interconnected once more and a circuit inside the half bridge should make it possible for there to be offset timing.

The same process with an offset triggering of the parallel valves inside a half bridge can be realized even if the partial branches at the output are interconnected to a phase. To this end, though, before this node point at which the partial branches come together, a small inductance is respectively required, which prevents a hot branch inside the half bridge.

Figure 4:
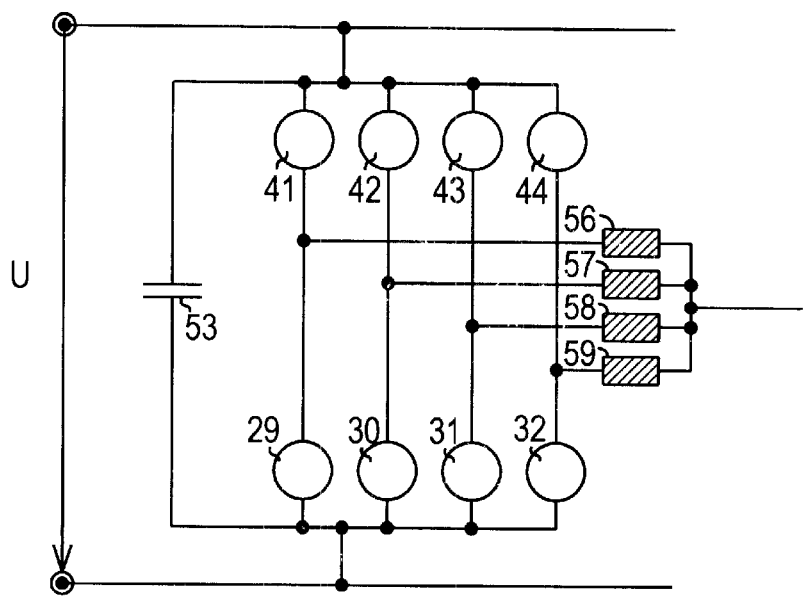
FIG. 4 shows a module of a half bridge for offset triggering.

FIG. 4 shows a module of a half bridge for a frequency converter with an offset triggering; by way of example, four parallel valves or switches 29, 30, 31, and 32 as well as 41, 42, 43, and 44 are shown here. However, any other number of parallel valves or another number of parallel partial branches is also possible. In addition, decoupling inductances 56, 57, 58, and 59 are provided, which are required for the functioning of the frequency converter.

Figure 5:
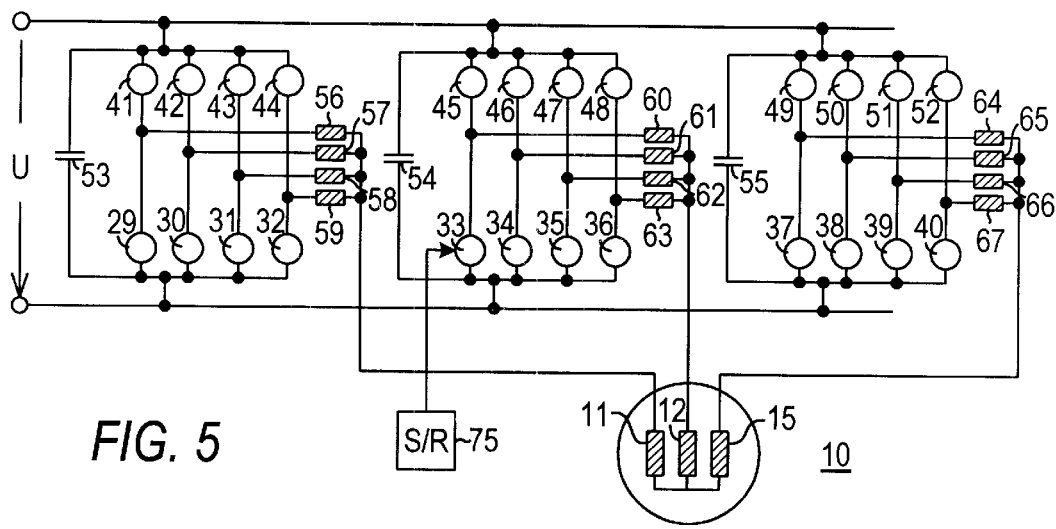
FIG. 5 shows a complete three-phase frequency converter, which is comprised of three identical half bridges for offset triggering.

FIG. 5 shows a complete three-phase frequency converter for a three-phase generator, for example a generator or a starter/generator in a motor vehicle, which includes three identical half bridges for offset triggering. Each of the half bridges is associated with inductances 56 to 67. The description of the frequency converter device shown in FIG. 5 corresponds to the explanations made in conjunction with FIGS. 1 to 4. The connection between the switch or valve 33 and the control and regulating device 75 is indicated as an example of the connection for the triggering of the switches or valves.

Figure 6:
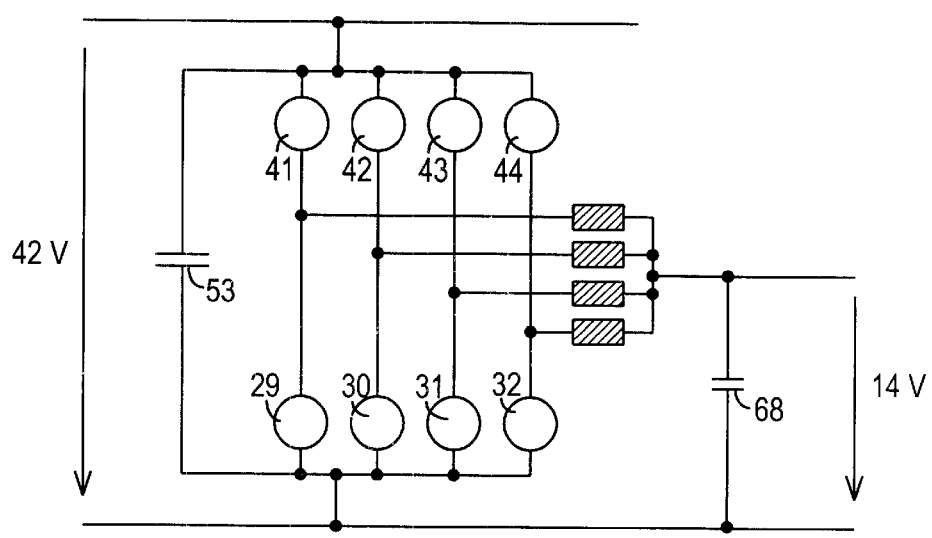
FIG. 6 shows an embodiment of the invention for a direct current converter (DC/DC converter) with different voltage levels and FIG. 7 shows a combination of intermediary circuit currents for various keying ratios.

An exemplary embodiment for a voltage converter (DC/DC converter) is shown in FIG. 6. A half bridge with triggerable switches 29 to 32 and 41 to 44 as well as the decoupling inductances 56 to 59 can also be used purely as a DC/DC converter. To this end, the bridge module requires only the addition of a capacitor 68 at the output. The inductance required for a DC/DC converter is already in place due to the presence of the decoupling inductances 56 to 58.

Principle of the Offset Timing

The offset timing of the parallel transistors within a bridge branch results in a considerably lower load on the associated intermediary circuit capacitor. This should be demonstrated by an example. For the schematic depiction, it has been assumed that there are high inductances at the outputs so that the currents can be considered to be constant. In addition, the intermediary circuit current of only one half bridge has been considered. With the complete frequency converter bridge, the harmonic components in the intermediary circuit current at least partially cancel each other out so that more favorable conditions are achieved.

By way of example, the remaining considerations will now be based on four parallel switches (k=4). With the offset timing within a bridge, in addition to the keying ratios v=0 and 1, there are then three additional keying ratios in which the intermediary circuit capacitor 53, 54, 55 according to FIG. 1, 4, or 5 is not loaded, at least theoretically. This is true for the keying ratios v=²⁄₈, ⁴⁄₈, and ⁶⁄₈. The number of load-free keying ratios is in principle equal to the number of parallel switches k plus one (k+1).

The keying ratios at which the intermediary circuit capacitor(s) is/are theoretically not loaded, are generally v=g/k, where g is a whole number between 0 and k (g=0; 1; 2; ... k). The keying ratios at which the maximal load of the capacitor(s) occurs are respectively disposed between these load-free keying ratios, at v=(g'−1)/2k, where g'=1; 2; ... k; i.e. without the value 0.

Figure 7:
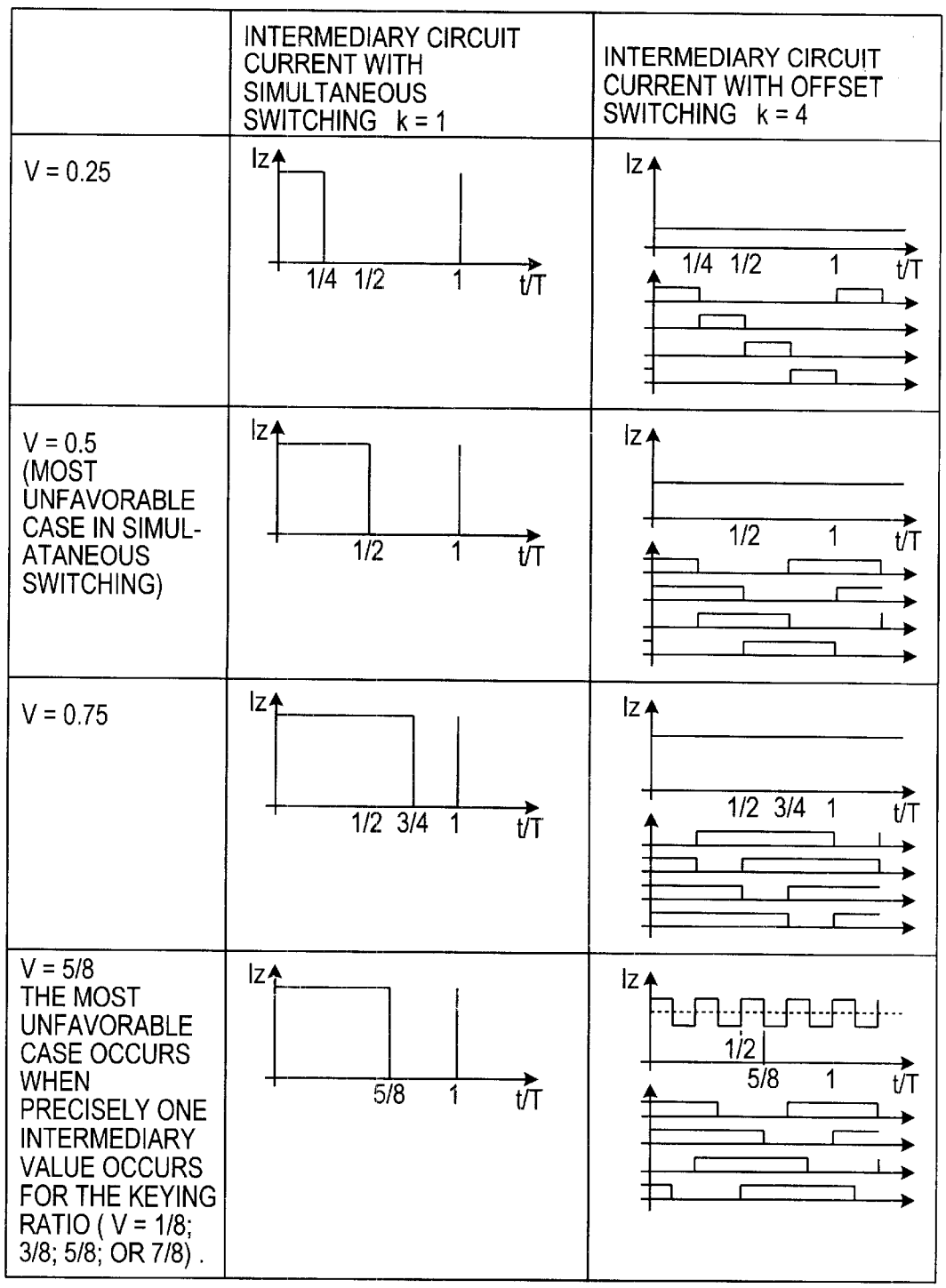

The so-called intermediary circuit currents to be supplied by the intermediary circuit capacitor are plotted for various keying ratios in FIG. 7. The keying ratios v=¼, ½, and ¾ are shown first. At these three keying ratios, the offset timing at least theoretically produces no load on the associated intermediary circuit capacitor. The keying ratio v=⅝ is depicted as another example. At this keying ratio, offset timing produces a maximal load on the intermediary circuit capacitor.

The different capacitor loading with simultaneous triggering of the switches or valves and with offset triggering of the switches or valves permits the following table to be compiled:

|  | intermediary circuit current with simultaneous switching | intermediary circuit current with offset switching |
|---|---|---|
| unfavorable keying ratio | v = ½ | v = ⅝ |
| frequency | timing frequency $f_{PWM}$ | $4 f_{PWM} = k f_{PWM}$ |
| current jump | strand section $I_{strand}$ | $¼ I_{strand} = I_{strand}/k$ |
| effective capacitor current | $½ I_{strand}$ | $⅛ I_{strand} - I_{strand}/2k$ |
| required capacitance for the same voltage swing | C | $C/16 = C/k^2$ |

This triggering method can consequently reduce the size of the previously required electrolytic capacitor. With four parallel branches, the following intermediary circuit capacitance is produced:

$$C = C_{alt} \cdot \frac{1}{k^2} = \frac{C_{alt}}{16}$$

If in addition, a change is made to a different capacitor principle with a greater current carrying capacity in comparison to electrolytic capacitors, then the capacitance can usually be reduced further. In electrolytic capacitors, usually the current load has a deciding influence on the size since this is the limiting dimension. Therefore the capacitance used is usually greater then would be necessary for the required voltage ripple.

Furthermore, a greater voltage ripple (voltage fluctuation) can also be permitted which is easy to filter at the high frequencies (k $f_{PWM}$), which further reduces the intermediary circuit capacitance.

Necessary Inductance

Additional inductances 56 to 67 are required for the functioning of an offset triggering of parallel switches. As shown in FIGS. 4, 5, and 6, these inductances are disposed at the output of each partial bridge branch. As an approximation, it can be initially assumed that the voltage at the output node is at the constant average value of the pulsed voltage ($\overline{U}$=v·$U_Z$). Consequently the inductance results in a voltage of $$U_L = \begin{cases} U_Z - v \cdot U_Z & \text{for } v \cdot T_{PWM} \\ -v \cdot U_Z & \text{for } (1-v) \cdot T_{PWM} \end{cases}$$

If ohmic resistance is ignored, the integral over $U_L$ must be equal to zero $$\left( \int_0^{T_{PWM}} U_L \, dt = 0 \right).$$

With a permissible voltage fluctuation of $\Delta I$, the required inductance is calculated according to the following equation:

$$L = v \cdot (1-v) \cdot \frac{U_Z \cdot T_{PWM}}{\Delta I}$$

In this connection, the least favorable instance occurs at a keying ratio of v=0.5. The output inductance simultaneously represents an output filter so that the slope steepness of the output voltage is reduced. This filter action can be further improved by means of an additional capacitance at the phase outputs of the frequency converter. In addition, the line inductances from the switching elements to the junction point can also be used here.

Figure 8:
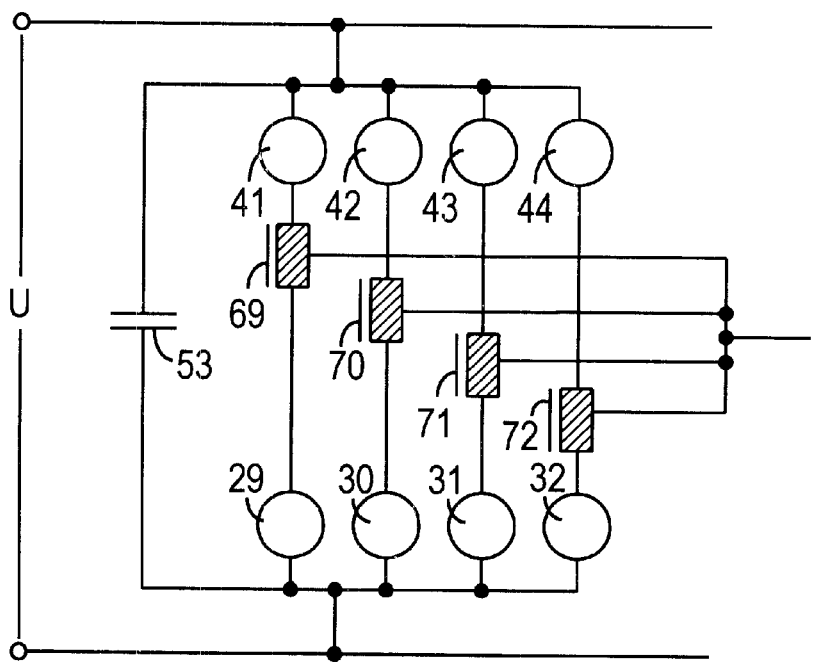
FIG. 8 shows a bridge module with longitudinal chokes.
Figure 9:
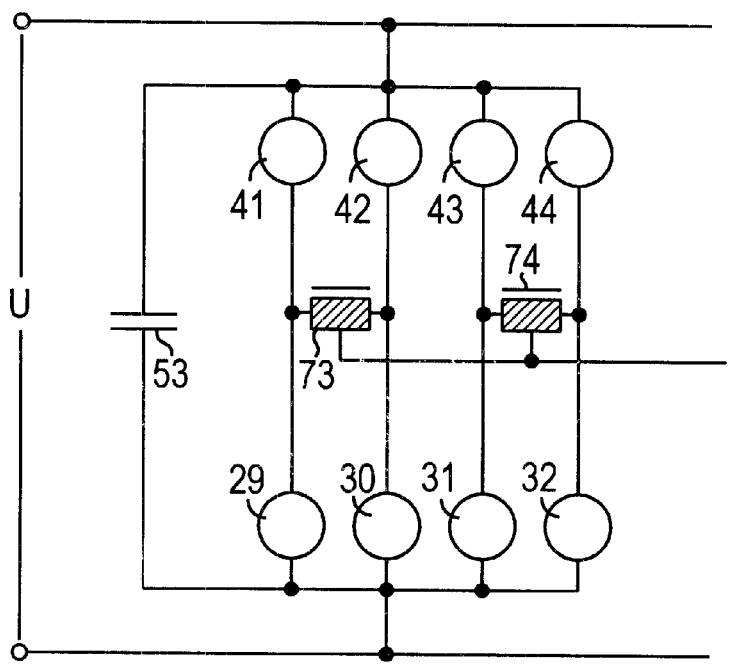
FIG. 9 shows a bridge module with lateral chokes for a rectifier bridge.

Combined chokes are also conceivable for the inductances at the output of the half bridges. The chokes are disposed in the form of longitudinal chokes according to FIG. 8 or lateral chokes according to FIG. 9.

The circuit with longitudinal chokes 69 to 72 is in principle functional. In this instance, for example, all of the coils that respectively have a central tap can be attached to a common core. However, the leakage between the two windings of the chokes can be problematic. In addition, the chokes must be installed in a low-inductance manner in the branch between the transistors of the switches or valves. However, common discharge circuits can be used here for the valves.

If a coupled choke is inserted between every two valve branches, this produces an apparatus with lateral chokes 73 and 74. A lateral choke performs the function for both branches. Consequently, half the number of chokes is required in comparison to the embodiment with longitudinal chokes. In addition, each choke only has to be dimensioned for the differential current of the two branches. The average output currents of these two branches cancel each other out in the choke flux. This variant is particularly advantageous if the two branches between which the chokes are disposed are the ones which are offset from each other by $T_{PWM}/2$.

Since the frequency converter experiences a current ripple, i.e. a current fluctuation, in its switching elements, the on-state losses and switching losses are correspondingly greater. The current ripple is independent of the instantaneous load current and is primarily determined only by means of the keying ratio v.

$$\Delta I = v \cdot (1-v) \cdot \frac{U_Z \cdot T_{PWM}}{L}$$

Consequently the current ripple also occurs to the full extent in the partial load range and during idling of the machine. The additional frequency converter losses as a result of the current ripple are likewise produced in the partial load range. Still other measures are therefore disclosed which achieve an improvement in the partial load range.

Improvement in the Partial Load Range

With regard to the losses that occur, a frequency converter with simultaneous switching in idling operation and in the lower partial load range is more favorable than other embodiments. In the partial load range, the simultaneously switching frequency converter can also get by with a smaller capacitance. Consequently, the partial load efficiency of the entire apparatus could be further improved if in the offset switching frequency converter, the offset of the triggering valves is changed with the load current. This means that in idling operation, the frequency converter is operated as a simultaneously switching frequency converter and in the full load range, it becomes an offset switching frequency converter whose control pulses are chronologically offset by $T_{PWM}/k$. This corresponds to a symmetrical distribution of the triggering impulses for the individual switches or valves.

Figure 10A:
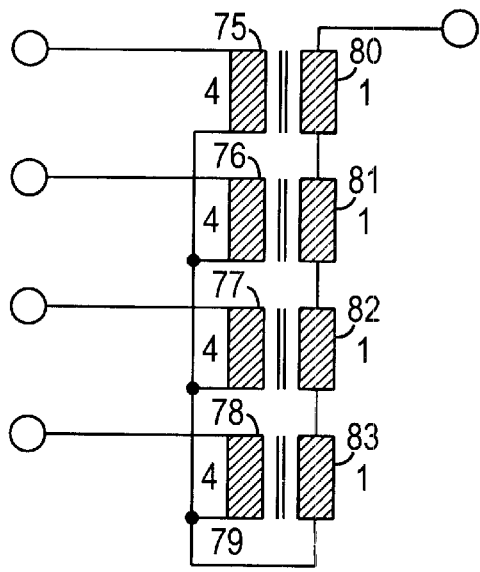
FIGS. 10a–10b, 11a–11c, 12 & 13a–13d show different choke devices.
Figure 10B:
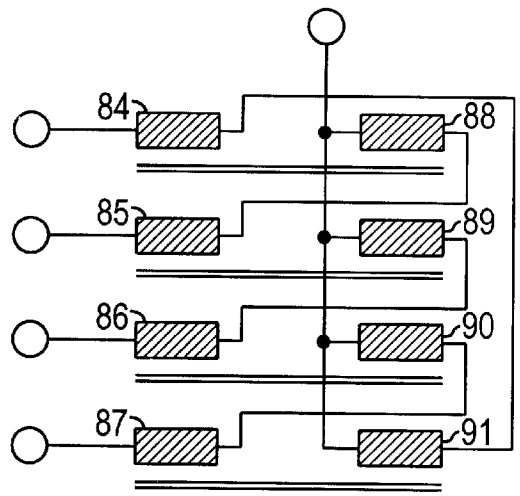
Figure 12:
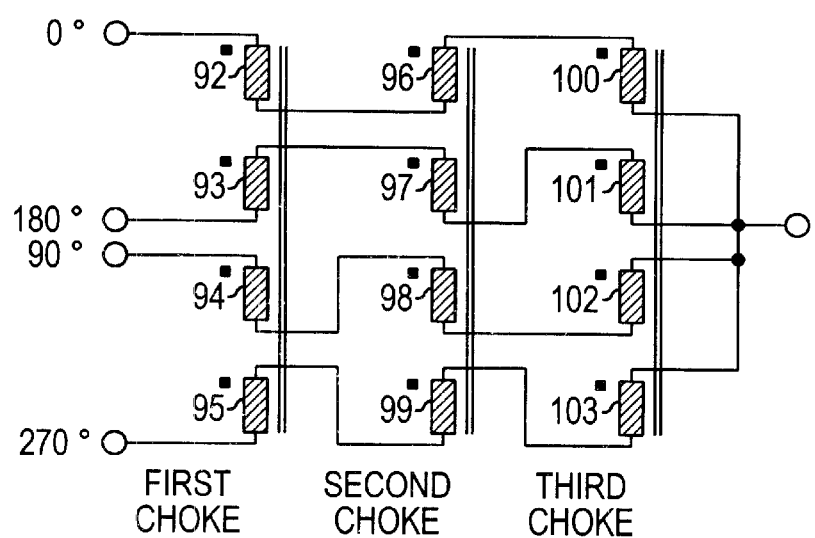
Figure 11A:
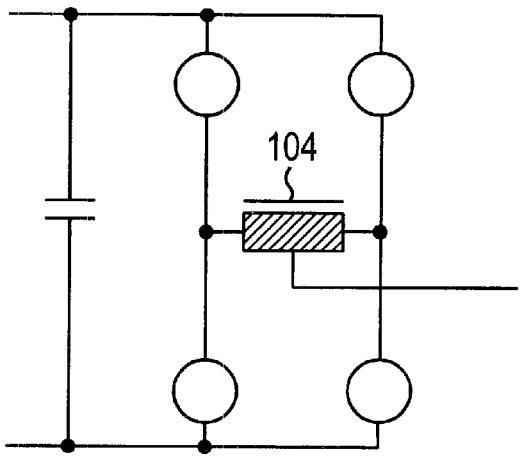
Figure 11B:
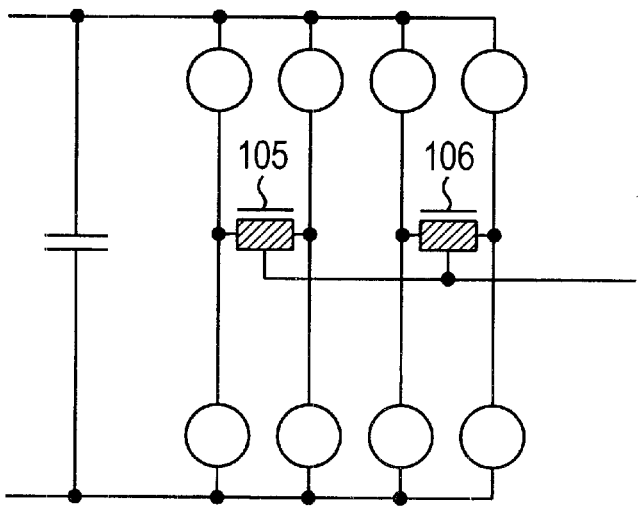
Figure 11C:
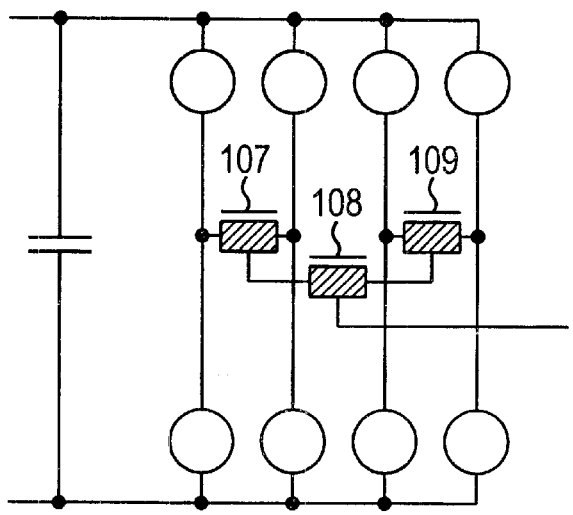
Figure 13A:
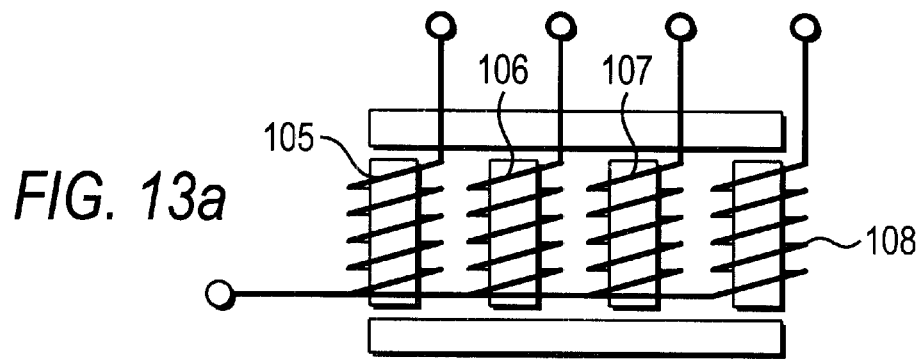
Figure 13B:
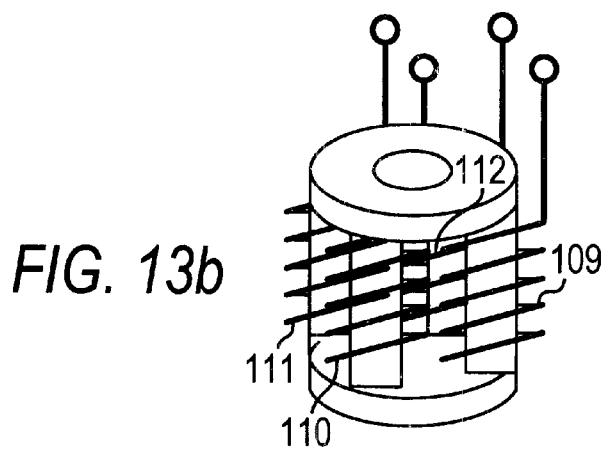
Figure 13C:
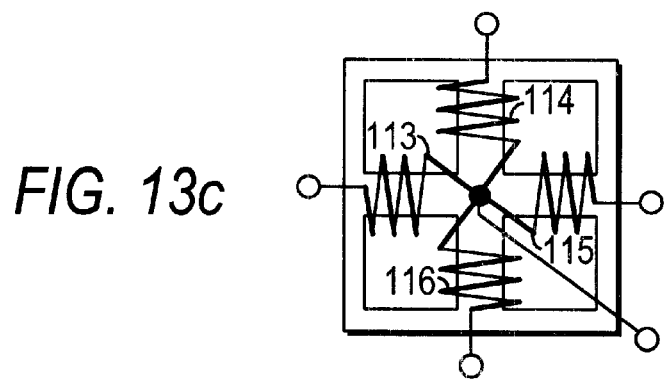
Figure 13D:
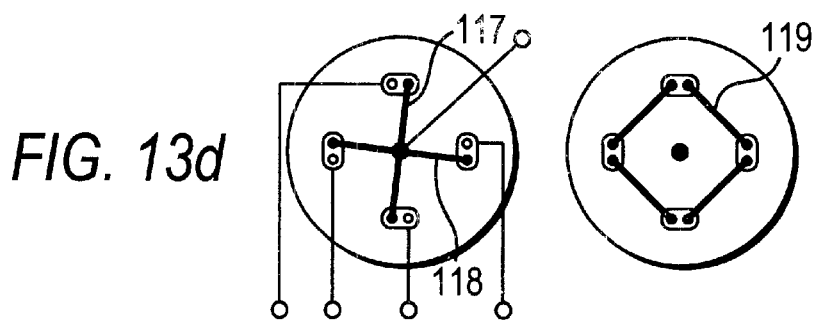
Figure 14:
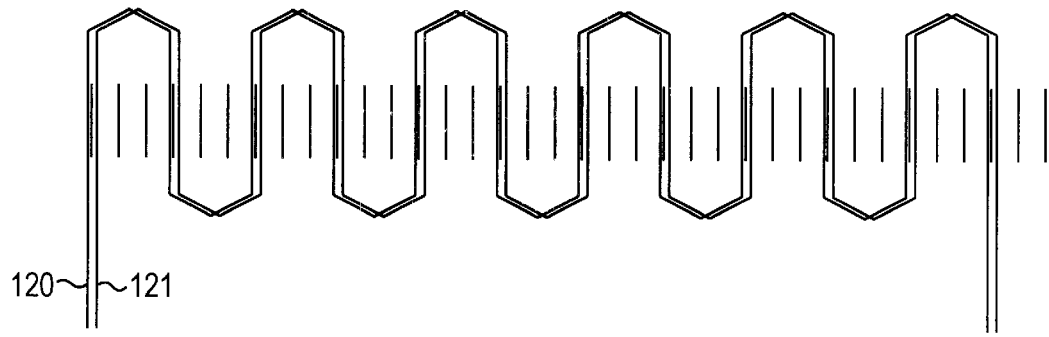
FIGS. 14 & 15 show examples for separate machine windings.
Figure 15:
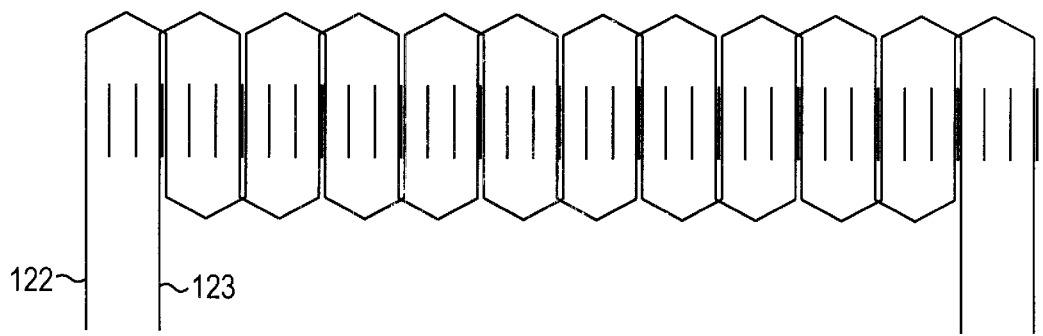

The previously mentioned possibility of using coupled chokes can produce the devices shown in FIGS. 10 to 12. FIGS. 13 to 15 show designs and winding arrangements which are suitable for decoupling the different partial branches of the frequency converter. A machine winding for a delta connected claw-pole generator is also shown, which is likewise suitable for decoupling two parallel partial branches. This winding is particularly well-suited since it can be integrated into modern generators with two winding wires.

Coupled or Compensated Chokes

Since only the inductances between the partial branches of the half bridge are required in order to decouple the partial branches from one another and since the load current of the half bridge does not require any additional inductance, the choke size can be reduced by means of coupled inductances. The coupled chokes should be dimensioned so that the load currents of the partial branches compensate for each other and do not cause any magnetic loading of the choke. Only the differential current between the individual partial branches (current ripple) then produces a magnetic field. The choke core only has to conduct the field of the differential current and can consequently be of considerably smaller dimensions. The windings, however, carry the full current and must be dimensioned appropriately.

FIG. 10 shows different possibilities for realizing the coupled chokes. Different principles for coupled chokes will be discussed below. By way of example, the starting point will be four offset switches. The switching principles, however, can also be transferred to other numbers of switches.

A: Singly Coupled Chokes

The coupled chokes 75 to 91 can be separately embodied, as shown in FIG. 10. (The valves or switches are depicted in FIGS. 10, 11, and 12 as circles without separate reference numerals.) In the arrangement on the left, the total current or load current is conveyed through all four chokes 75 to 83. For k=4, a winding number of 4 (=k) is required on the input side. In the arrangement on the right according to FIG. 10b, each pair of branches is interconnected.

Based on FIG. 10, each pair of chokes can also be combined on one core. FIG. 12 shows various possibilities. The chokes 92 to 95 then constitute a first choke, the chokes 96 to 99 constitute a second choke, and the chokes 100 to 103 constitute a third choke. Coupled chokes have two windings around a core. The two windings are connected so that their winding directions between the inputs and the output are opposite. For k=2, (see FIG. 11), the coupled choke can be inserted between the two partial branches of the frequency converter.

When k>2, it is unfortunately not possible to use coupled chokes in the accompanying form. If two coupled chokes are used, then switching states are produced in which both connections of a choke have the same potential applied to them, hot branches. Only their leakage inductance remains effective.

If there are more than two parallel branches, then every pair of branches can be connected together to a coupled choke. The choke outputs must be decoupled by means of an additional coupled choke. Consequently three coupled chokes are required for k=4.

B: Compensated Chokes

Additional circuit arrangements are used in order to be able to use structurally identical coupled chokes when k>2 (e.g. k=4). To this end, chokes 104 to 109 are required, which have k windings on a core. Therefore it is also easily possible to realize odd numbers of switches. What is required are k−1 chokes, each with k coils. An exemplary embodiment for compensated chokes is shown in FIG. 12.

C: Multi-Phase Chokes

The principle of compensated chokes can, however, also be combined when more than two parallel partial branches are combined on one core. However, chokes with k legs are required for this. The choke coil of a partial branch is disposed on each of these legs. There are various structural forms for the design of multi-phase chokes. Here, too, the example of four branches will be used as a starting point. The chokes here are represented as windings 105 to 116, each on a separate core or all on the same core. Different arrangements are shown in FIG. 13.

Parallel Arrangement

The prerequisite that a direct current in all of the branches (zero-sequence system) cause no flux is fulfilled by a column transformer. This principle for suppressing zero-sequence systems is known from three-phase technology. An equal magnetomotive force in all of the transformer legs does in fact lead to a magnetic current between the upper and lower yoke, but there are no magnetically conductive flux paths available here. Only a leakage flow from yoke to yoke via the air space can develop here.

Circular Arrangement

A further reduction of the weight can be achieved if the individual columns are not disposed next to one another in a plane but are arranged in a circle. The yokes can then be embodied as a closed ring and only require half of the cross section.

Star-Shaped Arrangement

Another possibility for the structural design of the choke is achieved when the four columns are arranged in a star shape. The inner yoke contracts. This choke offers the advantage that all of the choke coils are once again disposed in a plane. However, at the same time, the outer back iron is relatively long. The star-shaped arrangement can also be realized in a multi-hole core. In this connection, though, only winding numbers of one or two are logical; however these permit very simple designs to be realized. FIG. 13d shows a possible embodiment with the windings 116 to 119.

Separate Machine Windings

Two examples for separate windings are shown in FIGS. 14 and 15. Parallel wires 120 and 121 are shown in FIG. 14. The output inductances can be eliminated if the machine winding is comprised of parallel winding branches. If these are not connected to each other, then the winding ends can be connected directly to the partial branches of the frequency converter bridge. In claw-pole machines, the stator winding is produced by means of two wires wound in parallel. The windin is first connected to the rectifier plate to form a delta connection with the parallel wires. The winding is embodied as a shaft winding. To this end, the winding star is wound with both parallel wires and the following winding pattern for a strand is produced.

The inductance of two parallel round wires, with the length 1, the radius r, and a center point distance d, is calculated according to the following equation:

$$L = \frac{\mu_0}{\pi} \cdot l \cdot \left( \frac{1}{4} + \ln \frac{d}{\sqrt{r_1 \cdot r_2}} \right)$$

In this connection, the first value in the parentheses (constant=¼) represents the internal inductance of the line and the second value is the external inductance. Since the wires do not extend in strictly parallel fashion, slightly greater values are achieved in reality than in theory.

In the exemplary embodiment according to FIG. 15, there is a change in the winding. The currently common parallel routing of the wires is abandoned and replaced by two winding stars so that the winding heads of the two wires 122 and 123 can be separated.

Consequently, the inductance between the two wires is increased by double the winding head leakage. As a result, the effective inductance can be increased several times over in comparison to parallel wires. Consequently, a winding of this kind is suited for offset timing with two parallel branches. This does not permit higher numbers of branches, but higher numbers in the frequency converter can be made possible by means of additional chokes.

What is claimed is:

1. A frequency converter for converting electrical energy, in particular for a vehicle electrical system, having at least one half bridge which includes at least one high-side switch and one low-side switch with a predeterminable number of switches which have a common connection that is connected to means that produce the electrical energy and having a capacitor that is disposed parallel to the half bridge, further comprising control means, wherein said control means perform an offset control of the switches such that the switches are triggered offset from one another, wherein the offset triggering of the switches takes place within a branch of the bridge by selection of a high to low keying ratio, thereby providing a minimal load on the capacitor.

2. The frequency converter according to claim 1, wherein the means for producing the electrical energy are an electrical machine, in particular a generator or a starter/generator.

3. The frequency converter according to claim 1, wherein the means for producing the electrical energy are a three-phase generator with three phase windings, each with a predeterminable number k of parallel windings, that the frequency converter is a three-phase frequency converter which includes three identical half bridges with twice the number k of switches which are triggered in an offset fashion.

4. The frequency converter according to claim 1, wherein the high-side switches and low-side switches include field effect transistors, bipolar transistors, or pulse inverter elements which are triggered with the aid of said control means and regulating device and in particular, are operated in a pulse-to-width modulated manner.

5. The frequency converter according to claim 1, wherein the connection between the common connection of the high-side and the low-side switches and the means that produce the electrical energy respectively has at least one inductance.

6. The frequency converter according to claim 5, wherein the inductances are disposed as longitudinal chokes in series between mutually associated switches or are disposed as lateral chokes between four respective switches.

7. The frequency converter according to claim 1, wherein the half bridge is embodied and operated so that it functions as a direct current converter and in addition to the intermediary circuit capacitor at the output, has an additional capacitor at which a voltage occurs that differs from the voltage at the intermediary circuit capacitor.

8. The frequency converter according to claim 1, wherein the pulsed triggering of the switches takes place with pulse-to-width modulated signals with a keying ratio high to low which is selected so that the intermediary circuit capacitor is only slightly loaded and in particular, is equal to $2/8$, $4/8$, and $6/8$.

9. The frequency converter according to claim 1, wherein the individual partial frequency converters are combined into separate modules and are integrated into the machine housing.

10. The frequency converter according to claim 1, wherein the required chokes are embodied as singly coupled chokes or as compensated chokes.

11. The frequency converter according to claim 1, wherein the required chokes are embodied as multi-phase chokes and are disposed in a parallel arrangement, in a circular arrangement, or in a star-shaped arrangement, and have respectively adapted yokes.

12. The frequency converter according to claim 1, wherein the windings of the electrical machine have two parallel wires or two winding stars.

* * * * *